(12) United States Patent
Kilgore et al.

(10) Patent No.: US 11,129,438 B2
(45) Date of Patent: Sep. 28, 2021

(54) ITEM OF FOOTWEAR

(71) Applicant: FitFlop Limited, London (GB)

(72) Inventors: Marcia Kilgore, Founex (CH); David Cook, Oslo (NO)

(73) Assignee: FitFlop Limited, London (GB)

( * ) Notice: Subject to any disclaimer, the term of this patent is extended or adjusted under 35 U.S.C. 154(b) by 735 days.

(21) Appl. No.: 15/223,048

(22) Filed: Jul. 29, 2016

(65) Prior Publication Data

US 2016/0331079 A1  Nov. 17, 2016

Related U.S. Application Data

(62) Division of application No. 12/597,815, filed as application No. PCT/GB2008/001490 on Apr. 28, 2008, now Pat. No. 10,104,935.

(30) Foreign Application Priority Data

Apr. 27, 2007 (GB) .................................. 07080244

(51) Int. Cl.
  *A43B 13/16* (2006.01)
  *A43B 13/18* (2006.01)
  (Continued)

(52) U.S. Cl.
  CPC ............ *A43B 13/188* (2013.01); *A43B 3/108* (2013.01); *A43B 3/128* (2013.01); *A43B 7/14* (2013.01);
  (Continued)

(58) Field of Classification Search
  CPC ......... A43B 7/16; A43B 13/16; A43B 13/187; A43B 13/188; A43B 17/02; A43B 17/023;
  (Continued)

(56) References Cited

U.S. PATENT DOCUMENTS 2,284,620 A   6/1942 Jayne
2,374,487 A   4/1945 Jayne
  (Continued)

FOREIGN PATENT DOCUMENTS

EP   1 531 038 A1   5/2005
FR   2 522 482 A1   9/1983
  (Continued)

OTHER PUBLICATIONS

Korean Examination Report dated Oct. 31, 2016, Application No. UAE/P/ 0971/2009; 8 pages.
  (Continued)

*Primary Examiner* — Sharon M Prange
(74) *Attorney, Agent, or Firm* — Price Heneveld LLP

(57) ABSTRACT

An item of footwear for increasing leg-muscle and/or lower-abdominal-/back-muscle tone comprising: a securing means for securing the item of footwear to a foot of a user; and a sole comprising at least an upper layer, for engaging a foot of a user in use or a further upper layer, and a lower layer, for engaging the ground in use, wherein the upper layer comprises two or more materials of different compressive resistances, or densities, arranged as a frontal/toe region, an arch region and a heel region, the sole is arranged such that application of a user's weight, during use, causes instability in at least one portion of the upper layer, which requires balance correction by a user.

15 Claims, 4 Drawing Sheets

(51) Int. Cl.
*A43B 17/02* (2006.01)
*B29D 35/12* (2010.01)
*A43B 3/10* (2006.01)
*A43B 7/14* (2006.01)
*A43B 3/12* (2006.01)
*A43B 13/14* (2006.01)
*A63B 23/02* (2006.01)
*A63B 23/04* (2006.01)
*A63B 26/00* (2006.01)
*B29K 23/00* (2006.01)

(52) U.S. Cl.
CPC ............ *A43B 13/141* (2013.01); *A43B 13/16* (2013.01); *A43B 17/02* (2013.01); *A63B 23/0205* (2013.01); *A63B 23/0233* (2013.01); *A63B 23/04* (2013.01); *A63B 26/003* (2013.01); *B29D 35/122* (2013.01); *B29K 2023/083* (2013.01)

(58) Field of Classification Search
CPC .... A43B 17/14; B29D 35/0054; B29D 35/04; B29D 35/122; B29D 35/142
USPC .................... 36/30 R, 30 A, 31, 88, 103, 114
See application file for complete search history.

(56) References Cited

U.S. PATENT DOCUMENTS

| | | | |
|---|---|---|---|
| 4,030,213 A | 6/1977 | Daswick | |
| 4,372,059 A | 2/1983 | Ambrose | |
| 4,615,126 A | 10/1986 | Mathews | |
| 4,757,620 A | 7/1988 | Tiitola | |
| 5,014,706 A * | 5/1991 | Philipp | A43B 7/141 36/140 |
| 5,318,645 A * | 6/1994 | Yang | A43B 17/14 156/245 |
| 5,727,335 A | 3/1998 | Kousaka et al. | |
| 5,972,257 A * | 10/1999 | Liu | B29C 44/027 264/161 |
| 6,061,929 A * | 5/2000 | Ritter | A43B 3/0052 36/107 |
| 6,129,798 A * | 10/2000 | Yang | B29C 44/08 156/79 |
| 6,238,602 B1 * | 5/2001 | Liu | B29C 44/08 264/40.1 |
| 6,775,930 B2 | 8/2004 | Fuerst | |
| 6,782,639 B1 | 8/2004 | Muller | |
| 6,785,984 B2 | 9/2004 | Jackinsky | |
| 6,880,268 B2 | 4/2005 | Chen | |
| 7,464,490 B2 | 12/2008 | Lebo | |
| 7,549,237 B2 | 6/2009 | Gallegos | |
| 9,049,901 B2 * | 6/2015 | Dean | A43B 13/04 |
| 2003/0172548 A1 | 9/2003 | Fuerst | |
| 2004/0103558 A1 | 6/2004 | Everz | |
| 2004/0226076 A1 | 11/2004 | Chen | |
| 2006/0061000 A1 * | 3/2006 | Chun | A43B 13/04 264/45.4 |
| 2006/0123665 A1 | 6/2006 | Covatch | |
| 2007/0011917 A1 | 1/2007 | Hayes | |
| 2009/0260257 A1 | 10/2009 | Reinhardt et al. | |
| 2011/0283560 A1 * | 11/2011 | Portzline | A43B 13/04 36/31 |

FOREIGN PATENT DOCUMENTS

| | | |
|---|---|---|
| JP | 10327904 A | 12/1998 |
| WO | 2007/046133 A1 | 4/2007 |
| WO | 2008/132478 A1 | 11/2008 |

OTHER PUBLICATIONS

Korean Search Report dated Oct. 31, 2016, Application No. UAE/P/0971/2009; 4 pages.

* cited by examiner

ITEM OF FOOTWEAR

CROSS REFERENCE TO RELATED APPLICATIONS

This is a divisional application of co-pending U.S. patent application Ser. No. 12/597,815 filed Aug. 2, 2010 which was a U.S. National Phase Entry under 35 U.S.C. § 371 of, and claims priority under 35 U.S.C. Sections 119(a)-(d), 120, 363 and 365 to, International Application No. PCT/GB2008/001490, filed Apr. 28, 2008 which designated the U.S. and at least one other country in addition to the U.S. and claimed priority to UK Patent Application No. 07080244.9 filed Apr. 27, 2007. The specifications of these applications are hereby expressly incorporated by reference in their entirety to form a part of this application.

FIELD OF THE INVENTION

The present invention relates to an item of footwear for increasing leg-muscle and/or lower-abdominal-/back-muscle tone. The invention also relates to an item of footwear for improvement and rehabilitation of leg-muscle tone following ankle and/or foot injuries. The invention further relates to a sole, mid-sole and/or an insole for the same purposes. Additionally, the invention relates to a method for manufacturing said item of footwear, said sole, mid-sole and/or insole and the use of any of the above as part of an exercise regime.

BACKGROUND OF THE INVENTION

Most shoes are purchased because of their aesthetics or their comfort. Comfort shoes are designed to provide comfortable walking and standing for a user and often include reasonable internal padding, arch support and comfort soles. In normal use, prior art shoes provide a good stable base for a foot of a user and this, consequently, reduces the amount of muscle force required for a user to stand still or walk, whilst maintaining good balance.

However, it has surprisingly been found that, by providing a slight, but safely-measured, instability in the footwear, the amount of difficulty a user experiences balancing whilst walking or standing is increased and, therefore, more muscle activity is required to achieve equivalent good balance to when using prior art shoes. In particular, muscles such as tibialis anterius, tibialis posterior, rectus femoris muscles of the quadriceps and gluteus maximus have been found to work harder whilst wearing footwear having a slight instability. Further, as is well-known in human physiology, a muscle which is made to work harder improves in strength and has quicker recovery following exercise.

SUMMARY OF THE INVENTION

Accordingly, there is a need for an item of footwear that aids muscle toning and strengthening whilst a user is standing or walking around as they would do normally. Further, a user would not need to find specific time for training, as training of those muscles can be provided whilst carrying out normal activities, such as walking.

Accordingly, in a first aspect this invention provides an item of footwear for increasing leg-muscle and/or lower-abdominal-/back-muscle tone comprising:

a securing means for securing the item of footwear to a foot of a user; and a sole comprising at least an upper layer, for engaging a foot of a user in use or a further upper layer, and a lower layer, for engaging the ground in use, wherein the upper layer comprises two or more materials of different compressive resistances, or densities, arranged as a frontal/toe region, an arch region and a heel region, the sole is arranged such that application of a user's weight, during use, causes instability in at least one portion of the upper layer, which requires balance correction by a user.

Advantageously, a user of the item of footwear is caused to increase muscular activity whilst standing and walking to keep good balance. Therefore, muscle toning and strengthening is provided whilst, merely, standing and walking around. As indicated, balance correction on the part of the user requires additional muscle activity. When the instability is calibrated correctly, it is barely perceivable on the part of the wearer; however, over many steps, and when used in a lifestyle approach to fitness, the additional muscle activity required can help increase strength and levels of fitness in the muscle groups—especially as part of an exercise or rehabilitation regime. Most preferably, the item of footwear should be used frequently and as part of a daily exercise/rehabilitation regime.

According to a second aspect of the invention, there is provided an item of footwear for increasing leg-muscle and/or lower-abdominal-/back-muscle tone comprising: a securing means for securing the item of footwear to a foot of a user; and a sole comprising two or more materials of different compressive resistances, or densities, arranged as a frontal/toe region, an arch region and a heel, the sole being arranged such that application of a user's weight, during use, causes instability in the at least one portion of the upper-sole, which requires balance correction by a user, wherein the sole comprises an upper surface, for receiving a foot of a user or an upper layer of sole, and a lower surface, for contacting the ground or a lower layer of sole, the upper surface and the lower surface being closer together at the frontal/toe region than they are at the heel region to aid comfort and provide the feel to a user of a normal item of footwear.

According to a third aspect, the invention provides an item of footwear for increasing leg-muscle and/or lower-abdominal-/back-muscle tone comprising:

a securing means for securing the item of footwear to a foot of a user; and a sole comprising two or more materials of different compressive resistances, or densities, arranged as a frontal/toe region, an arch region and a heel region, the sole being arranged such that application of a user's weight, during use, causes instability in the at least one portion of the upper-sole, which requires balance correction by a user, wherein the thickness of the sole tapers from the heel to the frontal/toe region, to aid comfort and provide the feel to a user of a normal item of footwear.

According to a fourth aspect of the present invention, there is provided an insole for use with an item of footwear, for increasing leg-muscle and/or lower-abdominal-/back-muscle tone, the insole for receiving at least a portion of a foot of a user in use, the insole comprises two or more materials of different compressive resistances, or densities, arranged as a frontal/toe region, an arch region and a heel region, the insole is arranged such that the application of a user's weight, during use, causes instability in the portion of the insole, which requires balance correction by a user.

According to a fifth aspect of the present invention, there is provided a method of moulding part of an insole or a sole of a shoe comprising:

providing an arch region of first material of relatively lower compressive resistance or density;

providing a frontal/toe region and heel region of second material of relatively higher compressive resistance or density; and placing the arch region between the frontal/toe region and the heel region within a mould, and bonding the frontal/toe region, the arch region and the heel region together to form a unitary (in) sole having a wobble effect which, in use, requires balance correction by a user.

According to a sixth aspect of the present invention, there is provided an exercise regime using an item of footwear, as disclosed in claims 1 to 33, or an insole, as disclosed in claims 34 to 39 for increasing leg-muscle and/or lower-abdominal-/back-muscle tone, including wearing the item of footwear or an item of footwear containing the insole and applying weight to the item of footwear or insole to provide leg-muscle toning whilst standing and/or walking.

BRIEF DESCRIPTION OF THE DRAWINGS

Preferred embodiments of the present invention will now be described, by way of example only, with reference to the accompanying drawings, in which.

DETAILED DESCRIPTION OF THE INVENTION

The present invention relates to an item of footwear. In particular, a flip-flop is shown in the Figures and is, generally, referenced as 1. The flip-flop 1 includes a sole 2 and a strap arrangement |3|.

Figure 1:
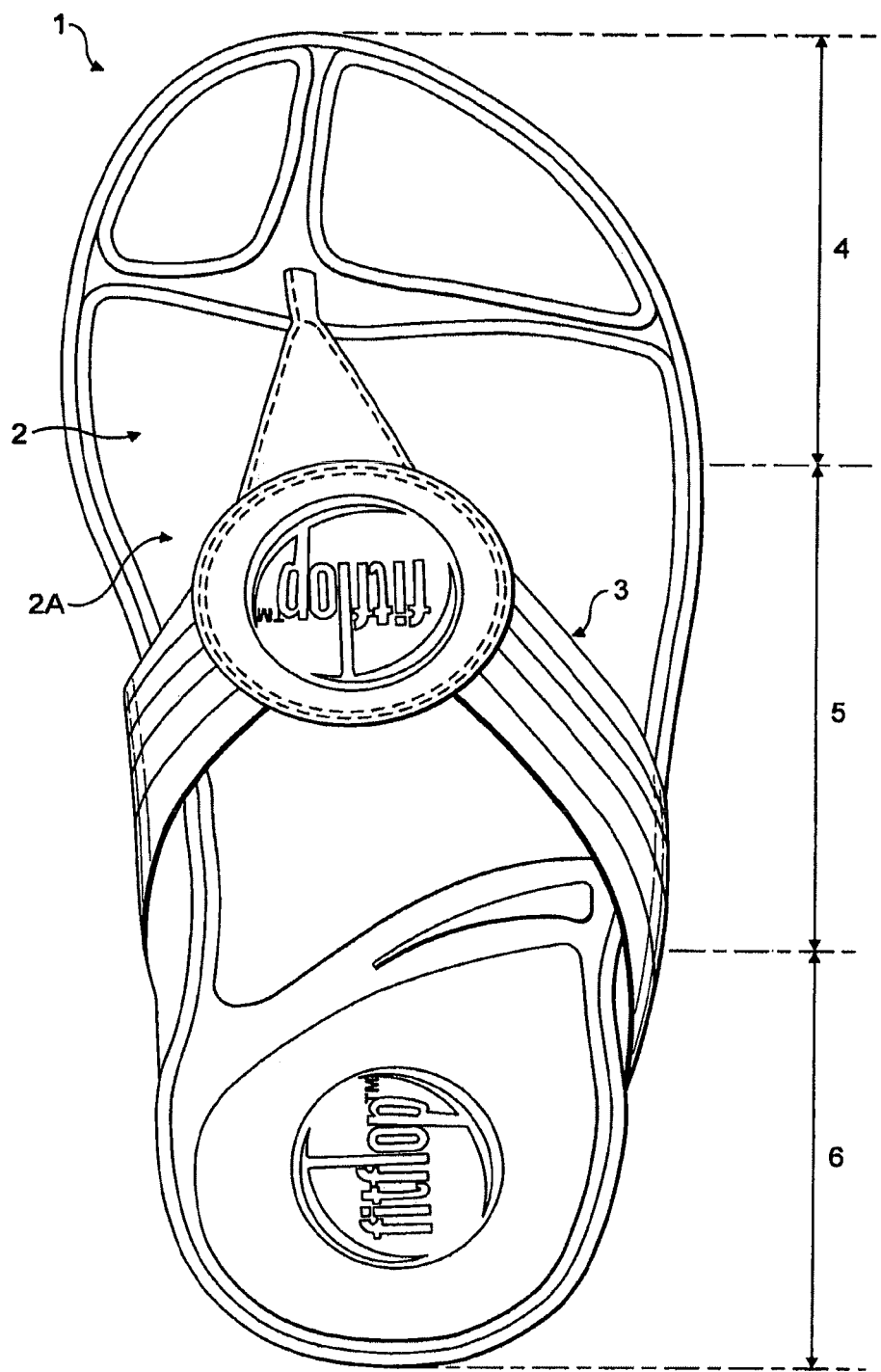
FIG. 1 is a schematic plan view of an item of footwear according to the present invention.
Figure 2:
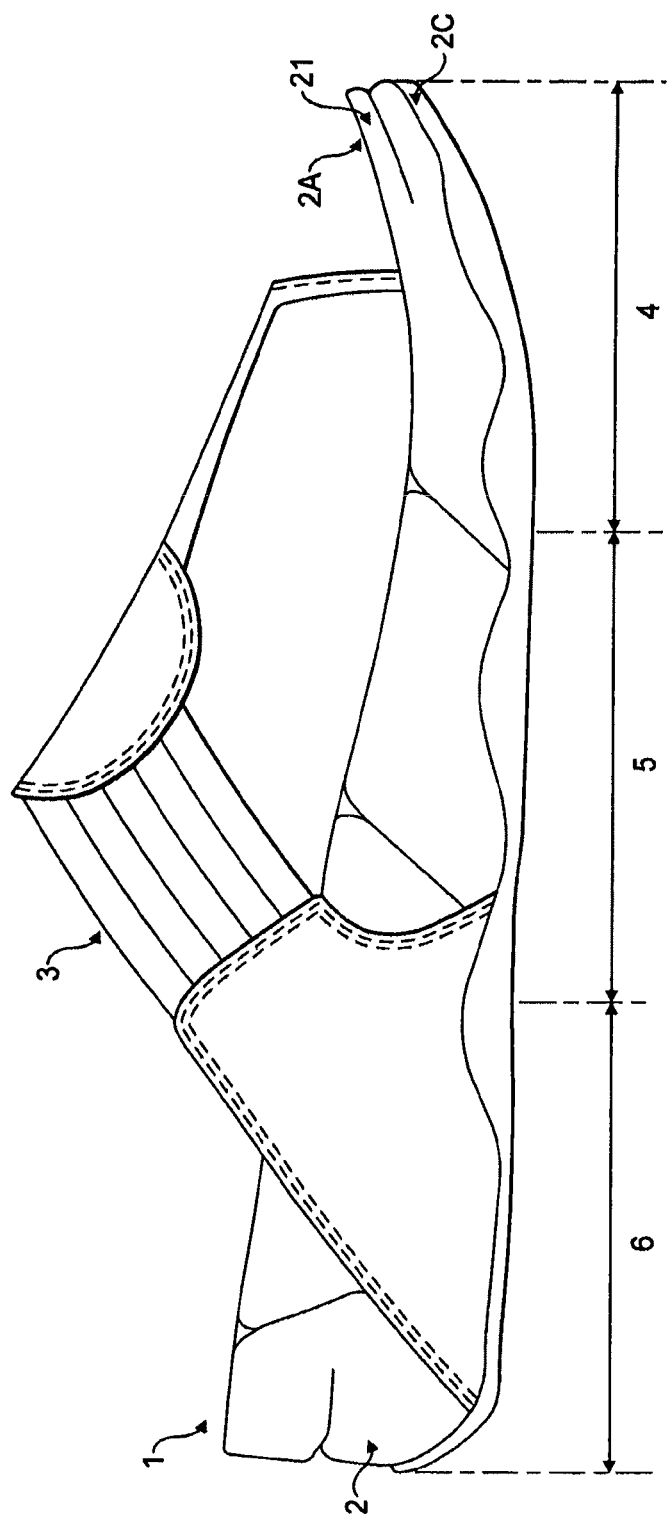
FIG. 2 is a schematic side elevation view of the item of footwear of FIG. 1.

As shown, the sole 2 is provided by an upper-sole 2A, a mid-sole 2B and a lower-sole 2C. The upper-sole 2A is bonded to the mid-sole 2B and the mid-sole 2B is bonded to the lower-sole 2C to provide a unitary sole 2. The upper sole 2A is provided to receive a foot of a user and is textured to provide gripping surfaces between a foot of a user and the flip-flop 1. In one embodiment, the upper-sole 2A may be integral with the mid-sole 2B (i.e. one layer) or, alternatively a separate layer. The lower-sole 2C is provided as a plantar surface of the flip-flop 1, i.e. a surface which contacts the ground, and may be provided with one or more ridges or grooves (not shown) for providing grip between the ground and the flip-flop 1. The lower-sole 2C is preferably one piece of material prior to bonding with the upper-sole 2A or mid-sole 2B. Naturally, as it contacts the ground, the lower-sole 2C is provided by a strong material having good wear characteristics. The sole 2 of the flip-flop 1 is provided in three general and approximate regions, as can be seen in FIGS. 1 and 2 in particular. An approximate frontal/toe region is indicated by reference 4. Further, an approximate arch region is indicated by reference 5. Further still, an approximate heel region is indicated by reference 6. In particular, the three regions of the sole 2 are provided by two or more materials of different compressive resistances, or densities, with the arch region being provided by the material of least compressive resistance or density. The sole 2 is arranged such that application of a user's weight/motion, during use, causes instability in the one or more portions of the sole which requires balance correction by a user. The amount of instability caused is quite slight but enough for small balance corrections to be made by the muscles of a user's leg. In particular, it is likely that the small balance corrections are carried out by a user sub-consciously, or with very little thought, but, nevertheless, it would be clear, when measured with biomechanical monitoring equipment, that increased activity of the muscles was apparent. A firm heel region (relative to the arch region) is important because the heel needs a firm level of compression resistance or density to give stability and propel the foot into the raid stance quickly and safely. If a heel region is too soft, the body responds by forcing the heel down harder at strike in order to gain stability faster—this can have poor consequences—so a soft heel region is preferred.

The arch region is a "question zone" where the foot is suddenly being asked questions—it is fooled by the heel region into thinking it is on a firm surface and the instability means it needs to respond to the softer arch region—go forward, go back, adjust left and right—responding to these questions takes effort and uses energy all the way up the leg.

The firmer toe region maintains speed of walking and gives the foot the stability and direction it needs to propel in the right direction—a soft toe region means using more than the big toe to step off and that is also not preferred.

The footbed profile is designed to not support the arch—rather allow the foot to behave naturally—it is not telling the foot what to do or how to behave.

In this particular embodiment, the sole 2 according to the present invention is provided by a specially constructed, multi-density material layer. In particular, the sole 2 is provided with the arch region 5 being of a first material of relatively lower compressive resistance or density, and a frontal/toe region 4 being of a second material of relatively higher compressive resistance or density. Further, the heel region 6 is provided by a third material—different from the second material—of relatively higher compressive resistance or density, when compared to the arch region 5. In particular, this embodiment describes a sole 2 having a harder heel region 6, a softer arch region 5 and a harder frontal/toe region 4, relative to each other. In a preferred embodiment, the frontal/toe region 4 is slightly softer than the heel region 6 but both the heel region 6 and the frontal/toe region 4 are harder than the arch region 5. By way of example, the hardness of the parts of the mid-sole 2B can compared using the Asker C scale test method (SATRA TM205:1999, with 15 second reading being taken) and the heel region 6 is preferably 54 (harder), the arch region 5 is 31 (softer) and the frontal/toe region 4 is 45 (also harder but not as hard as the heel 6). It is desirable to make the heel region 6 and the frontal/toe region 4 harder as the heel takes the most impact and in addition facilitates the forward motion of the foot when walking while the toe need to provide good 'push off' for walking.

Figure 3:
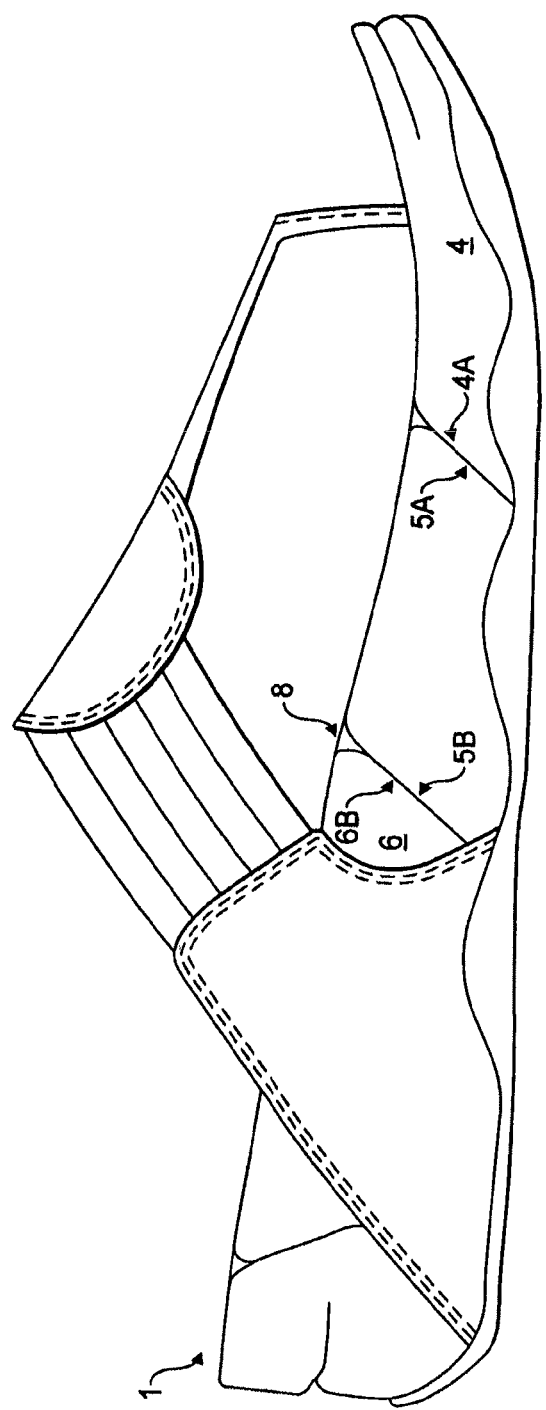
FIG. 3 is a schematic side elevation view of the item of footwear of FIG. 1 showing bonding of a frontal/toe region, an arch region and a heel.

As can be seen in FIG. 3, the frontal/toe region 4 abuts the arch region 5 along an interface 7. At the interface 7, the material of the frontal/toe region 4 is bonded to the material of the arch region 5. In a similar way, an interface between the arch region 5 and the heel 6 is provided at the interface 8. Although the interface 7,8 between the material could be vertical in nature, i.e. in the direction of the lower-sole 2C towards the upper-sole 2A, it is preferred to have a |tapered| interface that allows an overlap of materials from either side of the interface 7, 8. In particular, a tapered portion 4A of the frontal/toe region 4 overlaps with a tapered portion 5A of the arch region 5 in a horizontal overlap to form the interface 7. Further, a tapered portion 5B of the arch region 5 and a tapered portion 6A of the heel 6 overlap in a horizontal manner to form the interface 8. Advantageously, the tapered interfaces 7,8 provide a seamless join between the parts of the mid-sole 2B and provide a smoother transition from the harder 6,4 to softer 5 areas of the mid-sole 2B. Alternatively, the tapered portions 4A, 5A, 5B, 6A could be considered to be wedge-like.

Figure 4:
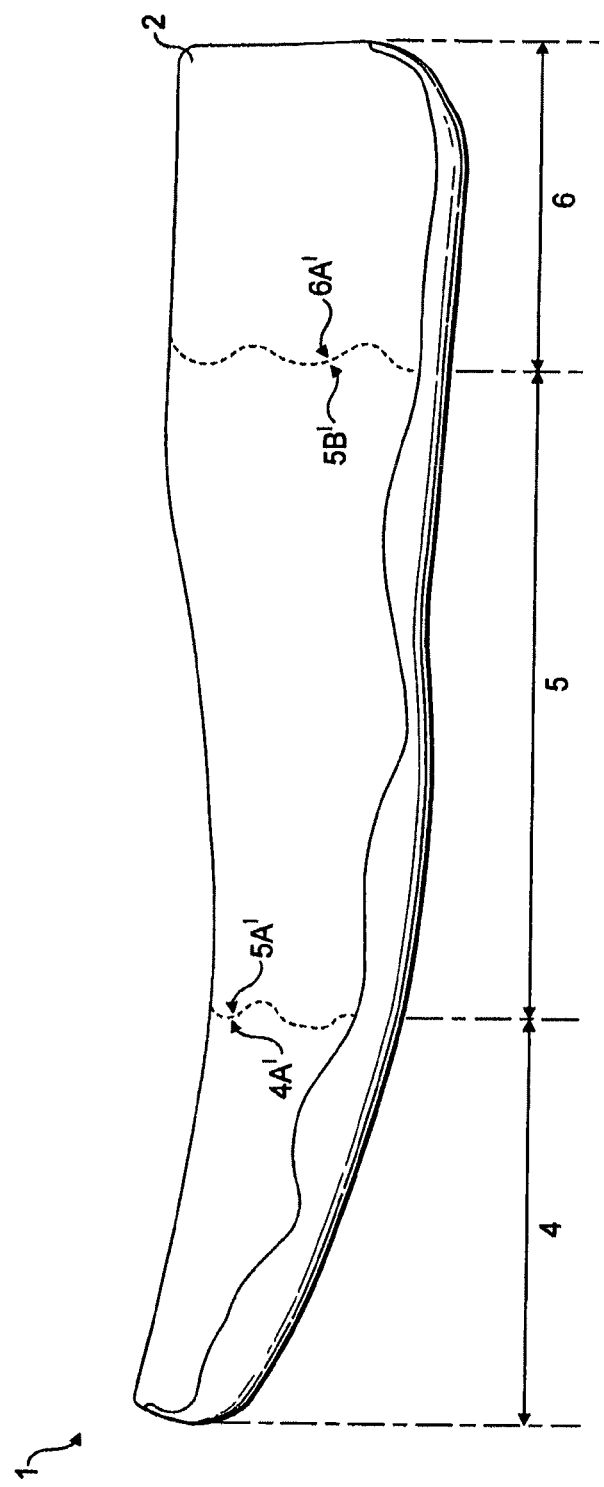
FIG. 4 is a schematic side elevation view of the item of footwear of FIG. 1.

FIG. 4 shows a most preferred embodiment of an item of footwear. As can be seen from that figure, the joining parts 4A1, 5A', 5B' and 6A1 of the frontal/toe region 4, arch region 5 and heel region 6 have irregularly-shaped joining edges. This increases the surface area of the bond between those regions. Whilst the irregularly-shaped edges may be provided on the regions prior to heating in the mould, it is also a beneficial consequence of the method of manufacture that they are provided in the formed item of footwear. Of course, the same applies to an insole of the present invention.

Advantageously, as can be seen in the Figures, the sole 2 is anatomically-shaped. The materials of the frontal/toe region 4, the arch region 5 and the heel 6 are arranged to provide a wobble effect—slight instability—such that the foot, when stepping across the sole from heel 6 to toe 4 wobbles slightly, altering the balance position of a user's foot. The wobble effect can be medio-lateral or anterior-posterior or a combination of anterior-posterior and medio-lateral instability. In particular, it is the progression from the heel 6 and the arch region 5, and the progression from the arch region 5 and the frontal/toe region 4 that allows the mid-sole to wobble and cause slight instability.

The embodiment of sole 2 shown in the Figures is substantially made of ethylene vinyl acetate (EVA). According to the invention, three different grades of EVA are utilised—having different compressive resistances or densities—for the mid-sole to provide the wobble effect. However, it will be understood that other materials will provide an equivalent effect and examples of those materials are other elastomers, silicones, natural or synthetic rubbers and/or polyurethanes.

The strap arrangement 3 (securing means) is connected to a part of the sole 2, in the region of the heel 6 in two places, one on each side of the flip-flop 1. The strap arrangement 3 is also connected to the upper-sole 2A (or the mid-sole 2B) in the region of the frontal/toe region 4 where it is positioned to be locatable between a first and second toe of a user.

In use, a user simply wears the flip flop 1 whilst standing or walking around to exercise or rehabilitate the muscles of the leg.

The method of manufacture of a sole or an insole—in particular a mid-sole—according to the present invention involves using three different densities of EVA material and then thermoforming them in a single mould to form a unitary (in) sole 2B. In particular, the material is combined using three different densities of uncured solid EVA compounds that have been pre-cut to approximate shape (heel, arch, toe) and introducing them to a first stage mould. The mould is heated to 160 degrees for β minutes in which time the solid compounds (EVA) melt, combine—although they remain roughly in the area of the mould they were introduced to—and release gases which are unable to escape. After brief cooling the mould is quickly released and the emerging mid-sole 2B experiences a sudden and dramatic increase to around four times the size of the mould it emerged from. This forms an EVA 'caster' unit. This EVA 'caster' unit is still at a lower density (and a rough shape) and requires further heating to reach the required density and take the final anatomical shape, by way of example, shown in the Figures, and this is done by trimming the 'caster' and placing it in a second stage mould, where it is subjected to heating for a further 6 minutes and cooling for a further 6 minutes to take the shape of the final product. Additionally, a lower-sole 2C can be subsequently added to the mid-sole 2B. Alternatively, the lower-sole 2C can be bonded with the mid-sole 2B in either or both moulds. The upper-sole 2A may be subsequently bonded, and may comprise a fabric layer.

In relation to an insole for use with an item of footwear, it will be understood that the insole can be placed in an item of footwear as an additional or alternative insole to that supplied with the footwear, or may be made integral with the item of footwear. Further, from the context of the claims, it will be understood that the insole may have any number of the sole features claimed in relation to the item of footwear. Accordingly, as the sole features of the item of footwear and the features of the insole are substantially identical, if not identical, reference is drawn to the corresponding passages.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of molding a part of an insole or a sole of a shoe, comprising:
   providing an arch region of first material of relatively lower compressive resistance or density;
   providing a frontal/toe region and heel region of second material of relatively higher compressive resistance or density;
   placing the arch region between the frontal/toe region and the heel region within a mold; and
   bonding the frontal/toe region, the arch region and the heel region together to form a unitary insole or sole having a wobble effect which, in use, requires balance correction by a user, wherein at least a portion of a lower-facing surface of each of the arch region, the frontal/toe region and the heel region are substantially planar with one another without a force being exerted on the unitary insole or sole by the user.

2. The method as claimed in claim 1, wherein bonding the frontal/toe region, the arch region and the heel region together includes heating the materials.

3. The method as claimed in claim 2, wherein bonding the frontal/toe region, the arch region and the heel region together includes compression of the materials.

4. The method as claimed in claim 2, wherein the mold includes a waffle press-type bonding apparatus.

5. The method as claimed in claim 1, wherein the method includes a first-stage molding process to provide a caster unit and a second-stage molding process to provide the unitary insole or sole.

6. The method as claimed in claim 1, wherein an additional layer is bonded to either or both of an upper-facing layer or a lower-facing layer of the unitary insole or sole.

7. The method as claimed in claim 1, wherein providing the arch region and providing the frontal/toe region and the heel region further include providing joining edges of the frontal/toe region and the arch region, and/or the arch region and the heel region that are irregularly-shaped, or correspondingly-tapered, to provide an increased sealing surface area.

8. The method as claimed in claim 3, wherein the method includes a first-stage molding process to provide a caster unit and a second-stage molding process to provide the unitary insole or sole.

9. The method as claimed in claim 3, wherein an additional layer is bonded to either or both of an upper-facing layer or a lower-facing layer of the unitary insole or sole.

10. The method as claimed in claim 3, wherein providing the arch region and providing the frontal/toe region and the heel region further include providing joining edges of the frontal/toe region and the arch region, and/or the arch region and the heel region that are irregularly-shaped, or correspondingly-tapered, to provide an increased sealing surface area.

11. The method as claimed in claim 8, wherein providing the arch region and providing the frontal/toe region and the heel region further include providing joining edges of the frontal/toe region and the arch region, and/or the arch region and the heel region that are irregularly-shaped, or correspondingly-tapered, to provide an increased sealing surface area.

12. The method as claimed in claim 9, wherein providing the arch region and providing the frontal/toe region and the heel region further include providing joining edges of the frontal/toe region and the arch region, and/or the arch region and the heel region that are irregularly-shaped, or correspondingly-tapered, to provide an increased sealing surface area.

13. The method as claimed in claim 1, wherein the wobble effect is in a medio-lateral direction.

14. The method as claimed in claim 13, wherein the wobble effect is in an anterior-posterior direction.

15. The method as claimed in claim 1, wherein the wobble effect is in an anterior-posterior direction.

\* \* \* \* \*